United States Patent
Keenan et al.

(10) Patent No.: US 10,457,005 B2
(45) Date of Patent: Oct. 29, 2019

(54) RUBBERIZED RFID TAGGED TIRE BLADDERS

(71) Applicant: COOPER TIRE & RUBBER COMPANY, Findlay, OH (US)

(72) Inventors: Patrick Keenan, Bowling Green, OH (US); Dale E. Schimmoeller, Leipsic, OH (US)

(73) Assignee: COOPER TIRE & RUBBER COMPANY, Findlay, OH (US)

( * ) Notice: Subject to any disclaimer, the term of this patent is extended or adjusted under 35 U.S.C. 154(b) by 0 days.

(21) Appl. No.: 16/074,612

(22) PCT Filed: Feb. 3, 2017

(86) PCT No.: PCT/US2017/016548
§ 371 (c)(1),
(2) Date: Aug. 1, 2018

(87) PCT Pub. No.: WO2017/136752
PCT Pub. Date: Aug. 10, 2017

(65) Prior Publication Data
US 2019/0039341 A1    Feb. 7, 2019

Related U.S. Application Data

(60) Provisional application No. 62/290,730, filed on Feb. 3, 2016.

(51) Int. Cl.
B29D 30/06      (2006.01)
B60C 19/00      (2006.01)
(Continued)

(52) U.S. Cl.
CPC ...... B29D 30/0654 (2013.01); B29C 33/3842 (2013.01); B29C 33/505 (2013.01); B60C 5/00 (2013.01); B60C 19/00 (2013.01); G06K 19/07758 (2013.01); G06K 19/07764 (2013.01); H01Q 1/2225 (2013.01);
(Continued)

(58) Field of Classification Search
CPC ........ B29D 30/0654; B29D 2030/0659; B29C 33/3842; B29C 33/505
See application file for complete search history.

(56) References Cited

U.S. PATENT DOCUMENTS

| | | |
|---|---|---|
| 4,721,590 A | 1/1988 | Trapp |
| 5,256,348 A | 10/1993 | Waller |

(Continued)

FOREIGN PATENT DOCUMENTS

| | | |
|---|---|---|
| CA | 2 679 111 A1 | 8/2008 |
| CN | 102610534 A | 7/2012 |

(Continued)

OTHER PUBLICATIONS

PCT/US2017/016548 International Search Report and Written Opinion, dated Apr. 20, 2017.

(Continued)

*Primary Examiner* — James P Mackey
(74) *Attorney, Agent, or Firm* — Fay Sharpe LLP (57) ABSTRACT

A tire curing bladder and associated method of forming same includes an elastomeric body and a radio frequency identification device (RFID) tag chemically bonded to the elastomeric body.

20 Claims, 5 Drawing Sheets

FIG. 4

(51) Int. Cl.
*B60C 5/00* (2006.01)
*B29C 33/50* (2006.01)
*B29C 33/38* (2006.01)
*G06K 19/077* (2006.01)
*H01Q 1/22* (2006.01)
*B29C 45/14* (2006.01)

(52) U.S. Cl.
CPC ..... *H01Q 1/2241* (2013.01); *B29C 45/14639* (2013.01); *B29D 2030/0659* (2013.01)

(56) References Cited

U.S. PATENT DOCUMENTS

| | | |
|---|---|---|
| 6,477,894 B1 | 11/2002 | Koch et al. |
| 7,144,236 B2 | 12/2006 | Wang et al. |
| 7,736,454 B2 | 6/2010 | Girard et al. |
| 8,021,507 B2 | 9/2011 | Iyanagi |
| 8,057,204 B2 | 11/2011 | Agostini et al. |
| 8,092,633 B2 | 1/2012 | Nakao et al. |
| 8,469,697 B2 | 6/2013 | Lindee et al. |
| 2004/0252072 A1 | 12/2004 | Adamson et al. |
| 2006/0164250 A1 | 7/2006 | Kawai |
| 2007/0139202 A1 | 6/2007 | Austin |
| 2007/0203416 A1 | 8/2007 | Lowe |
| 2007/0246150 A1 | 10/2007 | Lo Presti et al. |
| 2008/0084007 A1 | 4/2008 | Szyms |
| 2008/0303674 A1 | 12/2008 | Hara et al. |
| 2010/0032066 A1* | 2/2010 | Nakao .................. B60C 13/00 152/152.1 |
| 2011/0192543 A1 | 8/2011 | Toyofuku |
| 2011/0198402 A1 | 8/2011 | Tucker |
| 2013/0211248 A1 | 8/2013 | Cowan et al. |
| 2013/0231226 A1 | 9/2013 | Bonutti |
| 2014/0127338 A1 | 5/2014 | Altonen et al. |
| 2014/0314976 A1 | 10/2014 | Niiyama et al. |
| 2015/0075693 A1 | 3/2015 | Dorfi et al. |
| 2015/0086364 A1 | 3/2015 | Arienti et al. |

FOREIGN PATENT DOCUMENTS

| | | |
|---|---|---|
| CN | 203211423 U | 9/2013 |
| CN | 203544208 U | 4/2014 |
| CN | 103903049 A | 7/2014 |
| EP | 1 995 082 A1 | 11/2008 |
| JP | 2002355872 A | 12/2002 |
| JP | 2010-176454 A | 8/2010 |
| WO | WO 2016/105929 A1 | 6/2016 |

OTHER PUBLICATIONS

EP Application No. 17 74 8291.6, European Patent Office, Extended European Search Report, dated May 20, 2019.

* cited by examiner

RUBBERIZED RFID TAGGED TIRE BLADDERS

This application claims the priority benefit of U.S. provisional application Ser. No. 62/290,730, filed Feb. 3, 2016, the entire disclosure of which is expressly incorporated herein by reference.

BACKGROUND

The present disclosure relates to encapsulating an RFID tag within the rubber structure of a tire curing bladder for the purpose of identifying a specific bladder via the RFID electronic product code (EPC) number and identifying the manufacturing and logistical transportation history of the bladder.

A need exists for greater control over manufacturing, transportation, and storage/inventory. More particularly a need exists for improved remote identification, that is machine-readable (e.g., wireless) capabilities, of product and specifically a tire curing bladder, without adversely impacting quality and performance characteristics of the tire curing bladder.

SUMMARY

An improved apparatus, tire curing bladder and tracking/information system for the tire curing bladder is provided.

The tire curing bladder includes an elastomeric body and a radio frequency identification device (RFID) tag chemically bonded to the elastomeric body.

The elastomeric material is vulcanized.

The RFID tag is located adjacent on outer surface of the elastomeric body, and preferably positioned at a bead of the tire curing bladder.

The RFID tag is at least partially formed of an elastomeric material, and preferably formed of a similar material as the remainder of the tire curing bladder to enhance chemical bonding thereto.

In a preferred arrangement, the RFID tag includes first and second layers of rubber encapsulating the RFID tag, and at least one of the layers is chemically bonded to the elastomeric body.

The RFID tag further includes a conductive rubber antenna in one embodiment.

In a preferred arrangement, the RFID tag includes a chip that is mechanically and electrically joined to the rubber antenna, and the chip and antenna are encapsulated by the first and second rubber layers.

The vulcanized, elastomeric tire curing bladder body is dimensioned for receipt in a green tire which is dimensioned for receipt in a tire mold.

A method of making a tire curing bladder, includes mixing an elastomeric material, and positioning a radio frequency identification device (RFID) tag within a tire curing bladder mold. The method further includes molding and curing the mixture in the tire curing bladder mold whereby the RFID tag is situated adjacent an outer surface of the molded tire curing bladder.

The curing step further includes vulcanizing the elastomeric material.

The positioning step further includes locating the RFID tag along a surface of the tire curing bladder mold.

The positioning step further includes locating the RFID tag in the bead of the tire curing bladder.

An antenna configuration allows a RFID chip to fit within a bead ring of a typical tire curing bladder. There are no products commercially available today in the U.S. that are believed to meet this description.

This invention may be applied to a tire curing bladder within the manufacturing process. The invention may then be further utilized throughout the life of its service including manufacturing, transportation and within the tire factories and storage warehouses.

Incorporating an RFID tag within the rubber structure of a tire curing bladder (TCB) allows for individual, non-line-of-sight identification of a tire curing bladder.

Bladders may advantageously have an individual serial identification number which they currently do not.

Another benefit is that the entire manufacturing history and transportation history of a tire curing bladder may be recorded and analyzed. This may aid with quality control and any possible recall issues that might occur.

Another advantage resides in the non-line-of-sight identification capabilities of individual or multiple bladders which may be identified even when held within the shipping packaging or box of the tire curing bladder without the need to remove and scan individual bladders.

Still another benefit is that the tag will remain with the tire curing bladder throughout its life and there is no possibility for it to be removed without noticeably and critically damaging the product/bladder itself.

Given the addition of individual identification, a manufacturer may now have a computer scan and check to further ensure the proper bladder is placed within the proper curing press.

Presently bladders may be misplaced at times but using a combination of an RFID tag incorporated within the bladder and a reader infrastructure type system, the bladders may be tracked and have their location recorded at all times. This will further ensure they are used within the proper time period.

Since the rubber RFID tag must be made of a similar material to the tire curing bladder, specialized rubberized RFID tags must be made using ideally the same kind of rubber. At a minimum a similar type of polymer and cure package must be used to allow the RFID tag to be incorporated within the tire curing bladder.

Still other benefits and advantages of the present disclosure will become apparent to those skilled in the art upon reading and understanding the following detailed description.

DETAILED DESCRIPTION

A curing bladder is an important part of a tire vulcanizing process. The proper selection of butyl polymers and compounding materials for a bladder formulation is essential in ensuring durability, service life, and efficient operation in a tire factory.

The durability of the bladder is based on it resistance to heat and steam during the vulcanizing process, along with its very low permeability to gasses and water vapors.

To maximize bladder life, the correct size and tire fitment is critical, as the bladder stretch percentages must be accurately controlled in both the radial and circumferential directions. Bladders typically operate at 15% to 25% of stretch in both the radial and circumferential directions and in some instances may be required to stretch up to 50% or more in both the radial and circumferential directions.

Even though there are multiple bladder configurations, the general clamping within tire curing presses of the different configurations are very similar. The typical bladder will have two opposing clamp beads that create a seal to capture the curing media, such as steam, hot water, or inert gasses. The beads are typically secured in the curing press with a bead clamp plate or ring, wherein the bead clamp plate captures and holds the clamp beads of the bladder allowing the bladder to receive the curing medium and stretch outwardly from the press as a pressure of the curing medium within the bladder is increased. One possible alternative bladder configuration is a curing bladder having only a single opening and at least one bead formed at the opening to form a generally balloon shaped curing bladder, wherein the bead is typically secured in the curing press with a bead clamp plate or ring.

To get the most efficiency from the bladder, it is highly desirable to transfer the heat of the curing media at an accelerated rate through the bladder wall. This process is measured by "rate of transfer" and is known as thermal diffusivity.

The inclusion of the RFID tag in the bladder must not interfere with the thermal diffusivity of the bladder or the bladder's ability to stretch outwardly from the press. Further, the inclusion of the RFID tag in the bladder ideally will not reduce the service life of the bladder. Favorable results have been obtained by positioning the RFID tag in the area of the bladder clamp beads. At this location, the RFID tag is not in an area of the bladder that is required to stretch or to substantially transfer heat energy into the tire being cured. Accordingly, the thermal diffusivity, the ability to stretch, and the service life of the bladder with the RFID tag are substantially identical to these same properties in a bladder without the RFID tag. Additionally, locating the RFID tag in the area of the bladder clamp beads minimizes damage to the RFID tag when the bladder is installed in the tire curing press thus maintaining the functionality of the RFID tag when the bladder is removed from the curing press after the bladder has completed its service life.

A conventional tire curing bladder is of well-known construction and is typically formed of an elastomeric material such as butyl rubber. The tire curing bladder 100 of the present disclosure (FIGS. 1-4) is likewise preferably formed of the same or similar elastomeric material, e.g., butyl rubber, and advantageously incorporates the RFID tag 110 therein. The tire curing bladder 100 includes beads 102 that have a slightly greater cross-sectional dimension than the remainder of a thickness of wall 104 of the bladder. As mentioned above, and as will become more apparent and described further below, this allows the beads 102 to be secured in a tire curing press.

A thickness of the wall 104 of the tire curing bladder 100 is selected so that the wall of the tire curing bladder 100 is able to withstand the environment of the tire curing press, i.e. resistance to heat, pressure, flexing, etc. as an internal volume of the bladder is expanded in response to air, gasses, steam/water vapor, while maximizing the thermal diffusivity. The tire curing bladder 100 is dimensioned for receipt in a green tire and when pressurized (inflated), urges the green tire against the inner mold surface during the vulcanization process in the tire curing press. Thus, the wall 104 of the tire curing bladder 100 must have a thickness able to withstand the high pressure and high temperatures associated with the curing cycle where temperatures will reach over 200° C. Further, the cycles of expanding and retracting the tire curing bladder 100 during curing/vulcanization of the green tire requires the bladder to be able to withstand numerous curing cycles.

Within this rigorous environment, the RFID tag 110 associated with the tire curing bladder 100 must be able to withstand these conditions and perform effectively. It has been determined that a preferred location for the RFID tag 110 is to position the tag in the bead 102 of the tire curing bladder 100 (see detailed views of FIGS. 2 and 4). The RFID tag 110 is at least partially encapsulated into the bead of the tire curing bladder 100 where RFID tag would encounter minimal stretching compared to the remainder of the bladder wall 104. Mounting the RFID tag 110 in the bead 102 of the tire curing bladder 100 reduces structural strain imposed on the tag when compared to potentially locating the RFID tag along the wall 104 of the bladder because the bladder bead is securely clamped within the tire curing press. Thus the bead likewise is subjected to reduce stretching and straining compared to the remainder of the bladder 100 during the tire curing operation.

Figure 1:
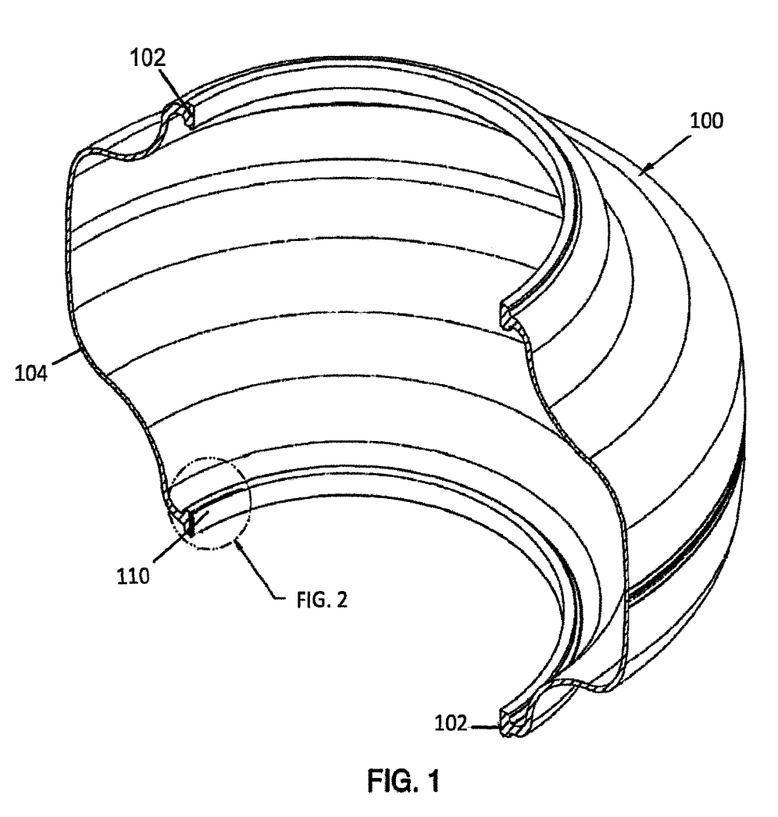
FIGS. 1-4 show an RFID tag in a tire curing bladder.
Figure 2:
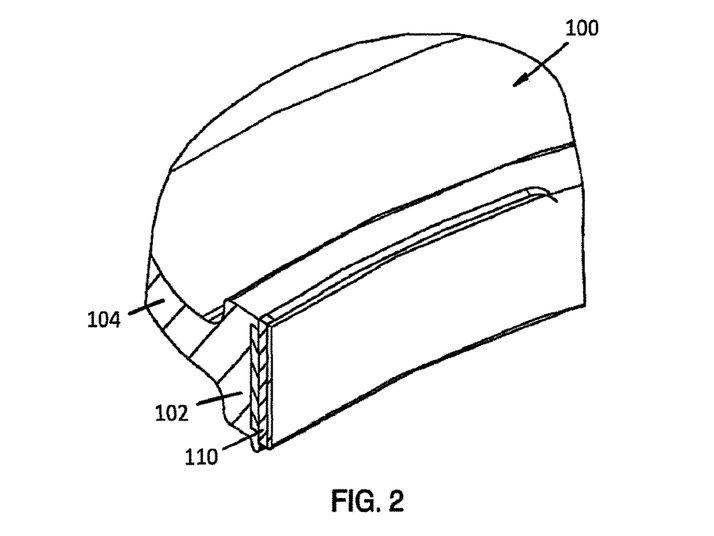
Figure 3:
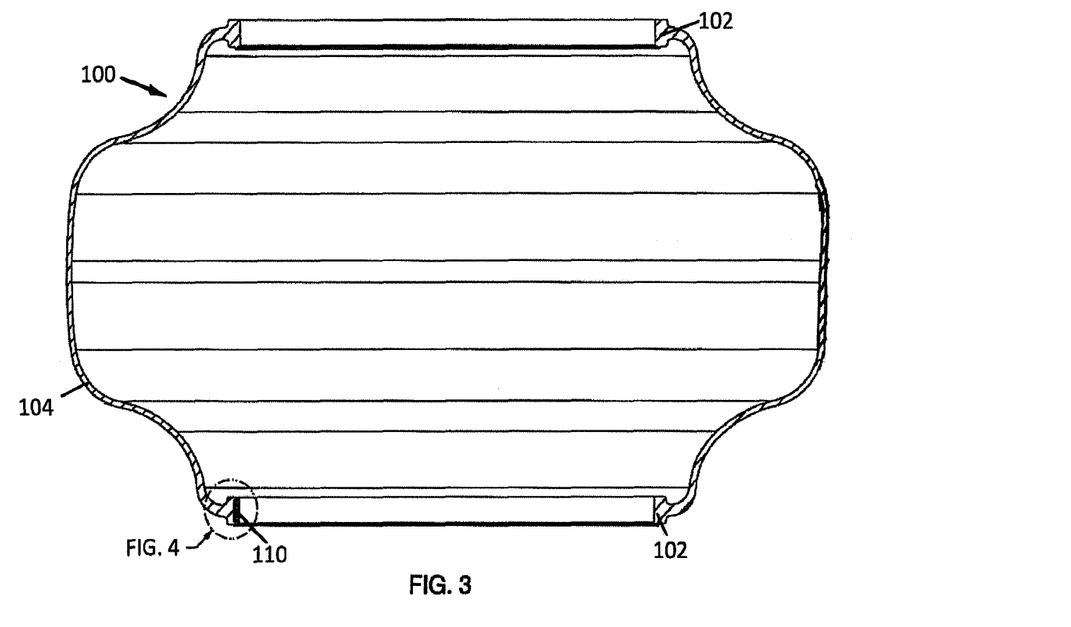
Figure 4:
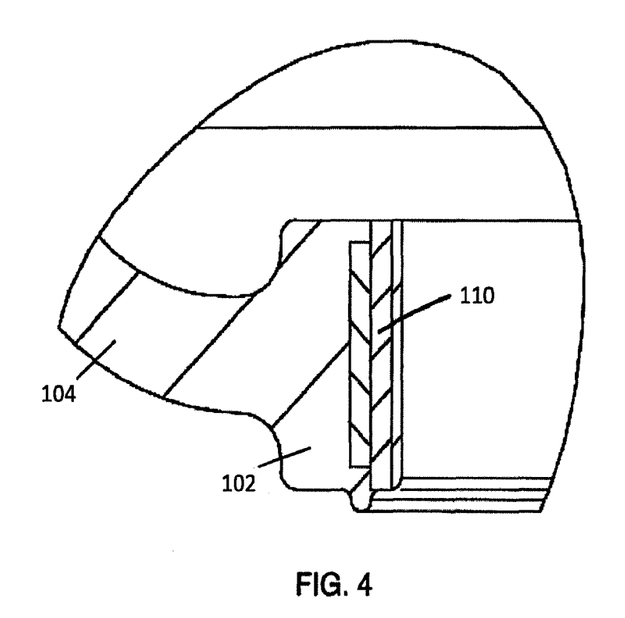
Figure 5:
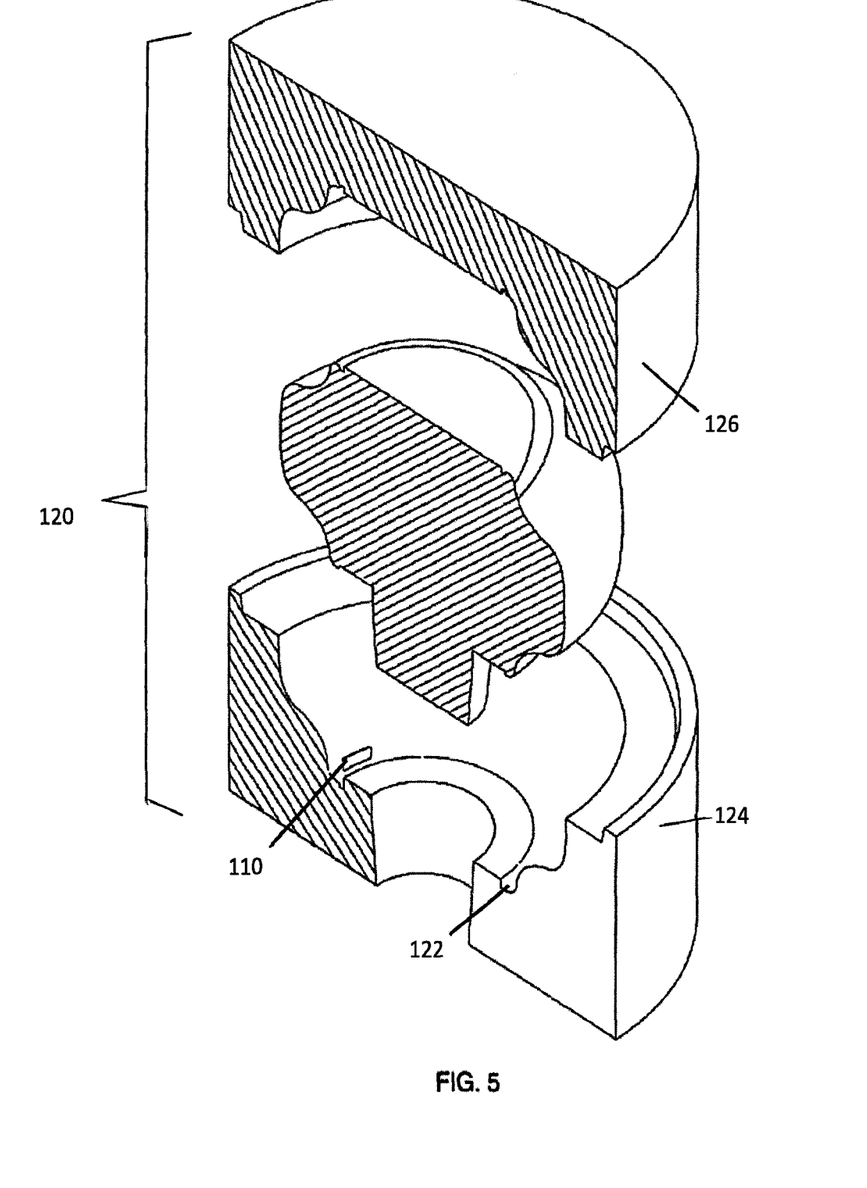
FIG. 5 is a view of a mold for forming a tire curing bladder, with an RFID tag positioned in the mold.

As shown in FIG. 5, the RFID tag 110 is placed or located in a tire curing bladder mold 120, and particularly along a bead region 122 in a lower mold component 124. Locating the RFID tag 110 in the bead region 122 allows the elastomeric material/butyl rubber that is injected into the bladder mold 120 to envelop around the RFID tag and maintain the desired positioning of the RFID tag in the bead 102 of the tire curing bladder 100. The RFID tag 110 is placed at the bottom 124 of the bladder mold 120 in the area 122 of the clamp beads. Gravity and flow of material during the injection process keeps the RFID tag 110 in the desired location. It should be understood that an adhesive may be disposed on an outer surface of the RFID tag 110 to facilitate retaining the RFID tag at a desired location within the bladder mold 120, wherein the adhesive is employed to releasably attach the RFID tag to a surface of the bladder mold (preferably the lower mold component 124, although it could be attached in the bead region of the upper mold component 126 without departing from the scope and intent of the present disclosure). Further, the rubber veneer of the RFID tag 110 may be formulated to have an adhesive property to facilitate retaining the RFID tag at the desired position within the bladder mold 120.

By forming a portion of the RFID tag 110 from a material that is compatible with the material of the tire curing bladder 100, the RFID tag is chemically bonded to the tire curing bladder and maintains structural integrity with the bladder. Thus as illustrated in FIGS. 1-4, the RFID tag 110 merges into the surrounding material constituting the remainder of the tire curing bladder 100.

Figure 6:
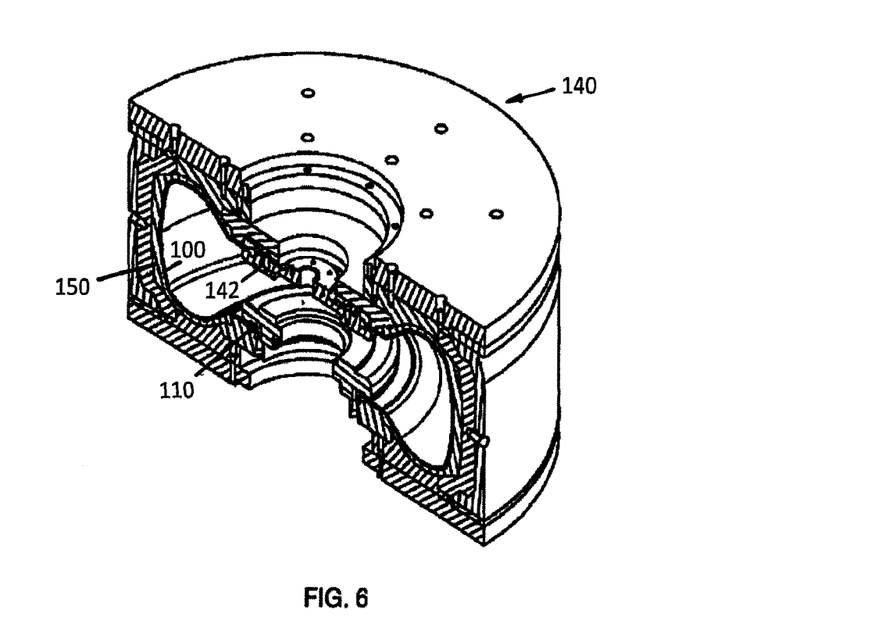
FIGS. 6 and 7 are cross-sectional views of a tire curing bladder inflated within a green tire being vulcanized within a tire curing press (with other details of the press eliminated for ease of illustration).
Figure 7:
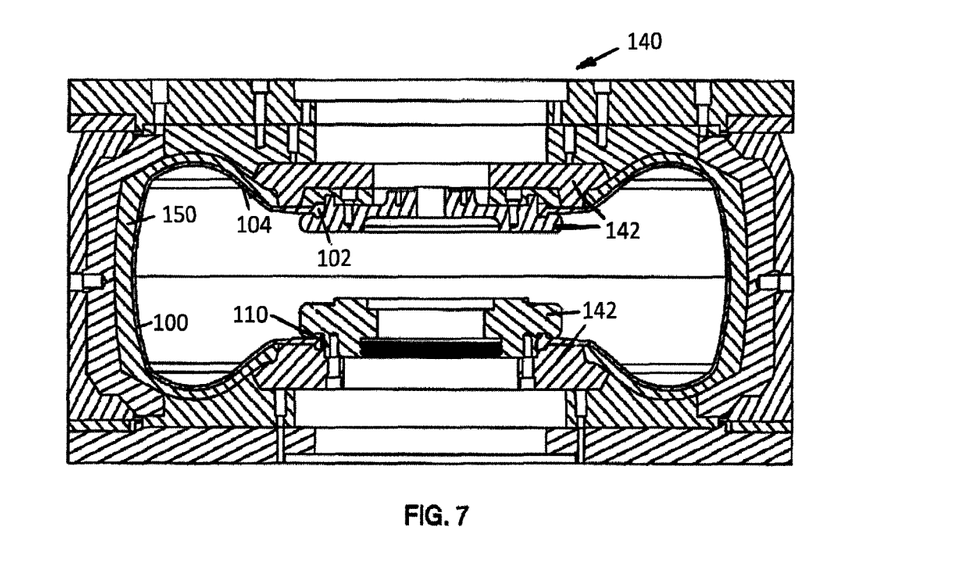

Particularly, and as is generally known in the art, the tire curing bladder 100 is sealed along the beads 102 in a tire curing press 140 (FIGS. 6-7). More specifically, the beads 102 are clamped between clamp plates or rings 142 such that the tire curing bladder 100 is advantageously mechanically and sealingly held in the tire curing press and within the green tire 150. As the curing medium is introduced into the interior of the bladder 100, the bladder wall 104 expands into the green tire and engages the interior surface of the tire where the bladder pressure urges the tire against the corresponding interior surface of the tire press, and the heat of the medium is transferred through the bladder wall and, in conjunction with heat transferred through the tire mold, effectively cure the tire. Again, the location of the RFID tag along the bead of the bladder isolates the tag from the strains of the expanding/contracting bladder, and also partly from the heat of the curing medium.

Figure 8:
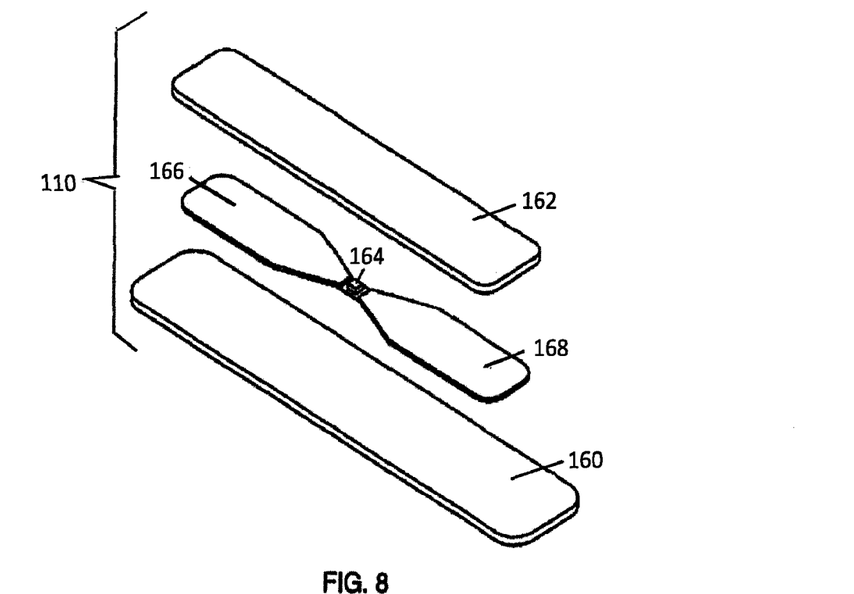
FIGS. 8-10 are an exploded perspective view, a plan view and an elevational view of a preferred RFID tag.
Figure 9:
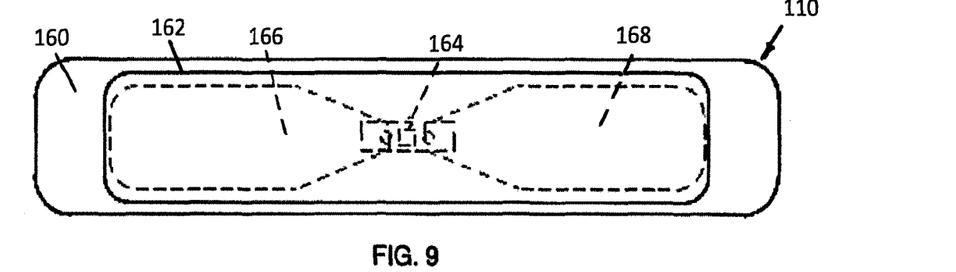
Figure 10:
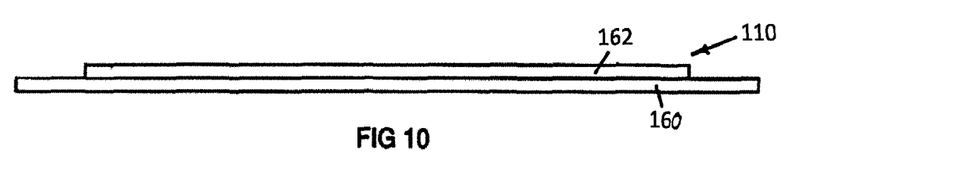

Technology exists to design and manufacture a rubberized RFID tag 110 (FIGS. 8-10). This tag 110 includes two rubber generally planar members or veneers 160, 162, an RFID chip 164, and two antennas, preferably conductive rubber antennas 166, 168. The two rubber antennas 166, 168 are each placed in contact with a specified conductive surface of the RFID chip 164. The combined unit is then placed on the first rubber veneer 160 and then the second rubber veneer 162 is placed over the top of the combined unit to form the rubberized RFID tag 110 (for example, see commonly owned application US2015/0314542A1 which is expressly incorporated herein by reference). The steps of this assembly process are not required to be performed in the order mentioned above. Other rubberized RFID tags using other technologies such as a metal antenna and additional forms of rubber encapsulated RFID tags would also be able to be incorporated in the tire curing bladder manufacturing process using the method described below.

In summary, when this assembly is performed using uncured rubber veneers of similar or identical material as the bladder itself, the tag may be incorporated into the tire curing bladder. This incorporation procedure is accomplished preferably by placing the rubberized RFID tag into the bottom of the tire curing bladder mold and then performing the routine procedure of injection molding tire curing bladder rubber material into the mold. The bladder rubber material will then fill the mold flowing around the tag but allowing the RFID tag to remain in the same general location which eventually will form the bead of the tire curing bladder. After the curing procedure of the bladder is complete and the bladder is removed from the mold, the rubberized RFID tag will be indistinguishable from the rest of the tire curing bladder, as well as chemically bonded to the structure.

The RFID tag in this invention is chemically bonded to the tire bladder and may not be seen to the untrained observer or removed without permanently damaging the product. This is in contrast to a conventional RFID tag sticker or bar code sticker which may inadvertently fall off the tire curing bladder or be unable to remain adhered to the tire curing bladder during the extreme environmental conditions in which this product operates (very high temperature and pressure). Additionally, due to the location of the RFID tag in the bead of the bladder, an area which encounters minimum flexing or stretching compared to the rest of the bladder, this RFID tag encounters little structural strain compared to what a tag might encounter if placed in an area outside of the bead.

As described above, one possible method of manufacturing a tire curing bladder involves injection molding rubber into a mold to form a tire curing bladder. The rubberized RFID tag would not be able to be passed through the same channel as the injection molding mechanism before entering the mold. Therefore the concept of placing a non-injection molded rubberized tag within a fixed location in the mold, performing the injection molding procedure, and having the rubberized RFID tag non-visibly and chemically integrated within the tire curing bladder is believed to be a novel concept that achieves the desired benefits and advantages over existing arrangements.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

It is claimed:

1. A curing bladder comprising:
   an elastomeric body made of an elastomeric material; and
   a radio frequency identification device (RFID) tag chemically bonded to the elastomeric body.

2. The curing bladder of claim 1 wherein the elastomeric material is vulcanized.

3. The curing bladder of claim 1 wherein the RFID tag is located adjacent an outer surface of the elastomeric body.

4. The curing bladder of claim 1 wherein the elastomeric body is a tire curing bladder.

5. The curing bladder of claim 4 wherein the RFID tag is positioned at a bead of the tire curing bladder.

6. The curing bladder of claim 4 wherein the RFID tag is at least partially formed of an elastomeric material.

7. The curing bladder of claim 6 wherein the RFID tag includes first and second layers of rubber encapsulating the RFID tag, and at least one of the layers is chemically bonded to the elastomeric body.

8. The curing bladder of claim 7 wherein the RFID tag further includes a conductive rubber antenna.

9. The curing bladder of claim 8 wherein the RFID tag includes a chip that is mechanically and electrically joined to the rubber antenna, and the chip and antenna are encapsulated by the first and second rubber layers.

10. A method of making a tire curing bladder, comprising:
    mixing an elastomeric material;
    positioning a radio frequency identification device (RFID) tag within a tire curing bladder mold; and
    molding and curing the mixture in the tire curing bladder mold whereby the RFID tag is situated adjacent an outer surface of the molded tire curing bladder.

11. The method of claim 10 wherein the molding and curing step includes vulcanizing the elastomeric material.

12. The method of claim 10 further including positioning the RFID tag along a surface of the tire curing bladder mold.

13. The method of claim 12 further comprising forming a bead on the tire curing bladder.

14. The method of claim 13 wherein the positioning step includes locating the RFID tag in the bead of the tire curing bladder.

15. The method of claim 10 wherein the molding step includes injection molding rubber material into the tire curing bladder mold once the RFID tag is situated in the tire curing bladder mold.

16. A tire curing bladder comprising:
- a vulcanized, elastomeric tire curing bladder body dimensioned for receipt in a green tire which is dimensioned for receipt in a tire mold; and
- a radio frequency identification device (RFID) tag chemically bonded to the elastomeric bladder body.

17. The tire curing bladder of claim 16 wherein the bladder includes a bead and the RFID tag is incorporated into the elastomeric bladder body adjacent the bead.

18. The tire curing bladder of claim 16 wherein the RFID tag includes first and second layers of rubber encapsulating the RFID tag, and at least one of the layers is chemically bonded to the elastomeric body.

19. The tire curing bladder of claim 18 wherein the RFID tag includes a chip and at least a portion of an antenna encapsulated in the encapsulating rubber.

20. The tire curing bladder of claim 19 wherein the antenna is formed at least in part by a conductive rubber.

* * * * *